(12) United States Patent
Kashiwada et al.

(10) Patent No.: US 6,447,167 B1
(45) Date of Patent: Sep. 10, 2002

(54) HYDRODYNAMIC BEARING, HYDRODYNAMIC BEARING APPARATUS

(75) Inventors: Tsuyoshi Kashiwada; Katsushige Konno; Kaoru Kaneko, all of Chiba; Tadashi Kiyokawa; Hajime Kiyokawa, both of Fukui, all of (JP)

(73) Assignees: Seiko Instruments Inc. (JP); Kiyokawa Plating Industry Co., Ltd. (JP)

(*) Notice: Subject to any disclaimer, the term of this patent is extended or adjusted under 35 U.S.C. 154(b) by 60 days.

(21) Appl. No.: 09/707,868

(22) Filed: Nov. 7, 2000

(30) Foreign Application Priority Data

Nov. 9, 1999 (JP) .............................. 11-318337
Oct. 19, 2000 (JP) ........................ 2000-319980

(51) Int. Cl.[7] .............................................. F16C 32/06
(52) U.S. Cl. .................................... 384/100; 384/107
(58) Field of Search ................................ 384/100, 107, 384/108, 109, 110, 114, 118, 120, 121, 123, 625, 907

(56) References Cited

U.S. PATENT DOCUMENTS

| | | | | |
|---|---|---|---|---|
| 5,009,520 A | * | 4/1991 | Takajo et al. ............... | 384/100 |
| 5,366,298 A | * | 11/1994 | Toshimitsu et al. .......... | 384/100 |
| 5,624,191 A | * | 4/1997 | Fuchs et al. ................. | 384/100 |
| 5,709,480 A | * | 1/1998 | Hong .......................... | 384/100 |
| 5,718,516 A | * | 2/1998 | Cheever et al. .............. | 384/100 |
| 5,768,784 A | * | 6/1998 | Williams et al. ............. | 384/100 |
| 5,998,898 A | * | 12/1999 | Fukutani et al. ............. | 384/114 |
| 6,064,130 A | * | 5/2000 | Konno et al. ................ | 384/107 |
| 6,155,721 A | * | 12/2000 | Kurosawa et al. ........... | 384/100 |

* cited by examiner

*Primary Examiner*—Thomas R. Hannon
(74) *Attorney, Agent, or Firm*—Adams & Wilks (57) ABSTRACT

In a hydrodynamic bearing apparatus for rotatably supporting a rotor by a hydrodynamic bearing, wear of the apparatus caused by sliding contact of dynamic pressure bearing faces in starting and stopping thereof is prevented to thereby promote durability, working of a dynamic pressure generating groove is facilitated and the bearing faces are prevented from being adsorbed to each other.

By providing a low friction metal layer having water repellency at dynamic pressure bearing portions of a hydrodynamic bearing apparatus, friction can be reduced, wear or dust formation can effectively be restrained and the bearing faces can be prevented from being adsorbed to each other by dew condensation.

5 Claims, 7 Drawing Sheets

HYDRODYNAMIC BEARING, HYDRODYNAMIC BEARING APPARATUS

BACKGROUND OF THE INVENTION

The present invention relates to a hydrodynamic bearing provided with a low friction metal layer having water repellency on a surface of the bearing, a hydrodynamic bearing apparatus, a fabrication method of a hydrodynamic bearing and a bearing surface working method providing a low friction metal layer on a surface of the bearing.

With high speed formation of information processing or image processing in recent years, there has been used a hydrodynamic bearing apparatus in a drive motor for driving a rotating member such as a polygon scanner motor apparatus or a disk apparatus and there are requested a small-sized and solid constitution, high durability and stable high-speed rotation thereof.

Figure 6:
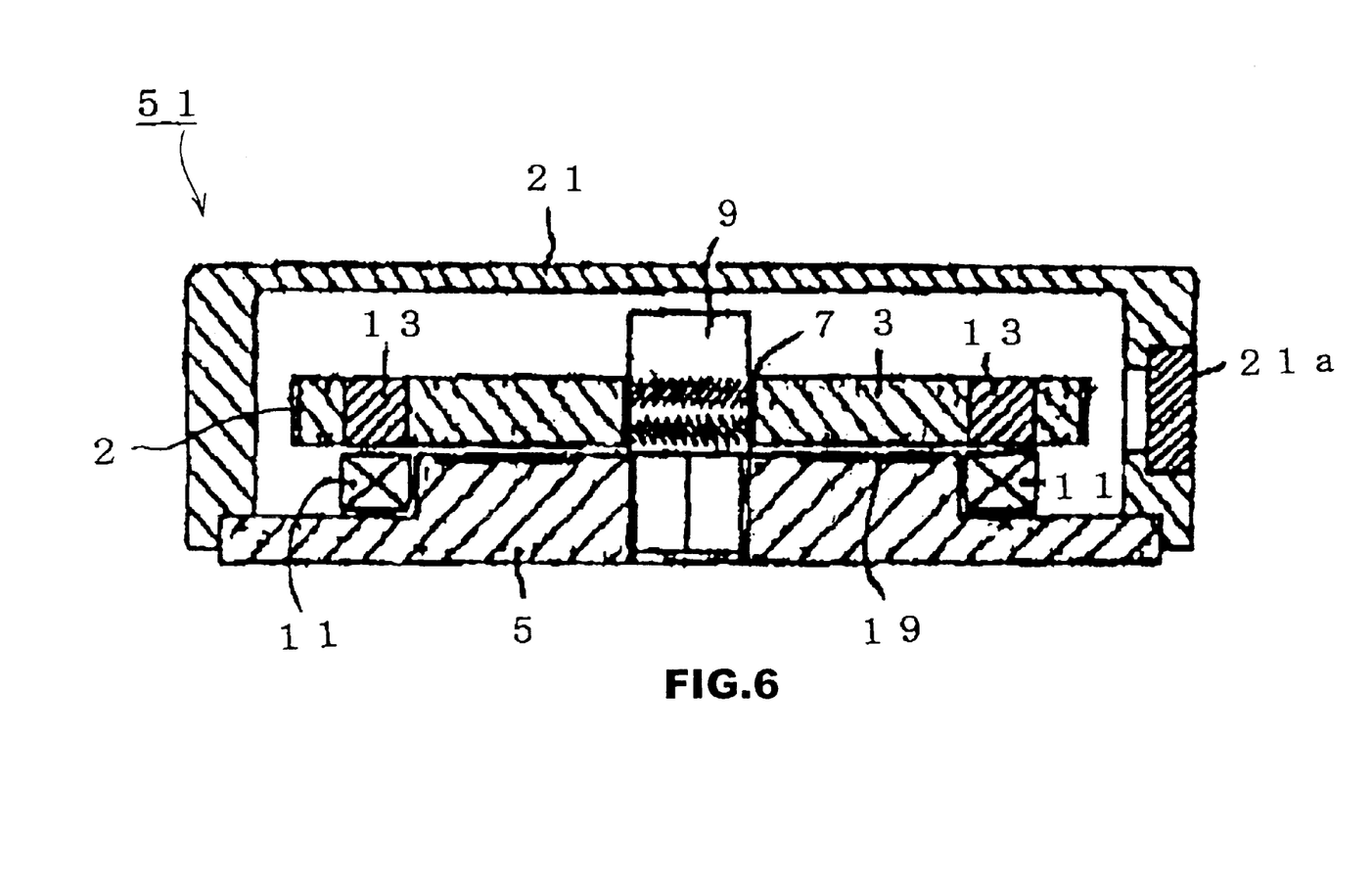
FIG. 6 is a vertical sectional view of a polygon scanner motor apparatus according to a related art.
Figure 7:
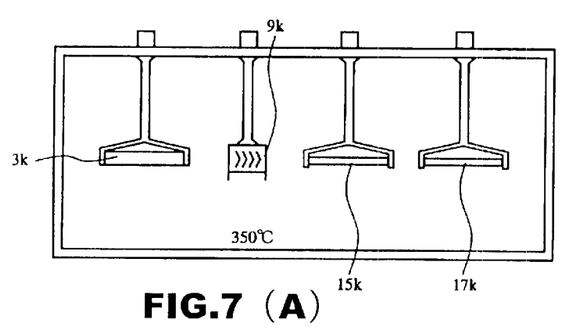
FIGS. 7A, 7B, 7C, 7D and 7E are views showing an embodiment of a fabrication method of a dynamic bearing according to the invention and a fabrication method of a dynamic bearing used in FIG. 1.

In order to meet the request, for example, as shown by FIG. 6, there is disclosed an invention in which a rotating member 3, a fixing portion 5 and a rotating shaft 9 fixedly attached to the fixing portions 5 are constituted by a ceramic material in Japanese Patent Laid-Open No. 241516/1988. According to the apparatus of the related art, the rotating member 3 having a multiple face mirror (polygon mirror) is provided rotatably relative to the fixing shaft 9 provided at the f fixing portion 5 and there are provided a magnet 13 provided to the rotating member 3 and an armature 11 having a stator coil for rotating the rotating member 3 opposed to the magnet 13.

Further, there is formed a dynamic pressure generating groove at either of bearing faces of the rotating member 3 opposed to the fixing portion 5 and the fixing shaft 9 and bearing faces formed at the fixing portion 5 and the fixing shaft 9 opposed to the rotating member 3 and the fixing portion 5 rotatably supports the rotating member 3 by pneumatic dynamic pressure, however, there poses a problem in which it is extremely difficult to work the dynamic pressure generating groove at the ceramic material finely and without increasing fabrication cost.

Hence, in order to resolve the above-described problem, there is provided a hydrodynamic bearing using light metal which is inexpensive and having excellent workability in place of the above-described ceramic material. For example, in the case of a hydrodynamic bearing used in a rotating multiple face mirror apparatus, adoption of an aluminum material is preferred, since there is achieved an advantage as the same material is used for the multiple face mirror made of an aluminum alloy including an advantage against a change in temperature. Further, in order to promote wear resistance of an aluminum material, there is known a constitution in which there is carried out Ni—P electroless plating including small particles of SiC on a surface of a bearing or a constitution in which a low friction resin layer is coated thereon.

However, according to the constitution of carrying out the Ni—P electroless plating including small particles of SiC on the surface of the bearing, irregularities remain on the surface of bearing. Further, in the case of a hydrodynamic bearing having a clearance of about 2 through 6 $\mu$m, such irregularities of the surface deteriorates dynamic pressure effect and accordingly are not preferable. Further, since friction force is comparatively large, there poses a problem of wear or dust formation by contact of the bearing faces when a motor is started or stopped.

Meanwhile, in the case of the constitution in which the low friction resin layer is provided by the Ni—P electroless plating including small particles of SiC, the irregularities of the surface are inconsiderable and accordingly, loss of the dynamic pressure effect thereby can be reduced, however, conversely, there poses a new problem in which the bearing faces are liable to adsorb each other by dew condensation since conversely, there are no irregularities. Further, the hardness is insufficient and it is difficult to completely resolve the problem of wear or dust formation. Further, there also poses a problem that static electricity is liable to store in a rotating member since there is no electric conductivity. In addition thereto, in the case of coating of resin, it is difficult to control a thickness of the resin layer, there is needed a step of preparing and selecting a member used integrally therewith having several stages of sizes or a step of coating the resin previously thickly and thereafter cutting the resin to a predetermined thickness and accordingly, time and labor are taken.

Hence, it is an object of the present invention to provide a hydrodynamic bearing, a hydrodynamic bearing apparatus and a fabrication method of a hydrodynamic bearing and realize a bearing surface working method capable of resolving the above-described problem.

SUMMARY OF THE INVENTION

The invention achieves the above-described object by providing a hydrodynamic bearing comprising a fixing member fixed to a side of a stator, a rotating member fixed to a side of a rotor capable of rotating relative to the stator and opposed to the fixing member via a fluid, and hydrodynamic pressure generating means for generating a dynamic pressure by the fluid between the rotating member and the fixing member in rotating the rotor, wherein in at least one of the rotating member and the fixing member, a surface thereof opposed to other thereof is a low friction metal layer having water repellency (first constitution of the invention).

The invention resolves the above-described problem by providing the low friction metal layer having water repellency on the surface of the bearing of the hydrodynamic bearing. That is, by providing the low friction metal layer, friction can be reduced and wear or dust formation can effectively be restrained. Further, by providing the metal layer having water repellency, condensed dew can be avoided from being stored, occurrence of adsorption between the rotating member and the fixing member by dew condensation can be prevented and corrosion by dew condensation can be prevented.

The low friction metal layer having water repellency can be formed by plating. Further, a layer thickness of the low friction metal layer having water repellency can strictly be controlled by controlling concentrations of respective components of a plating solution, a plating time period and temperature and can be restrained in a strict predetermined tolerance set in the rotating member and the fixing member of the hydrodynamic bearing.

Further, the low friction metal layer is provided with excellent conductivity and accordingly, static electricity can be avoided from staying.

With regard to the layer thickness of the low friction metal layer having water repellency, although depending on an apparatus of adopting the hydrodynamic bearing, in order to achieve low friction performance and water repellency while restraining a dispersion in the layer thickness within a predetermined tolerance which does not influence on the dynamic pressure, the layer thickness is preferably 0.2 through 20 $\mu$m and more preferably 5 through 10 $\mu$m.

The invention can be constituted by the hydrodynamic bearing in which the low friction metal layer having the water repellency is constituted by dispersing very small particles realizing the water repellency and the low friction performance in a metal base in the hydrodynamic bearing of the first constitution (second constitution of the invention).

In order that the very small particles are dispersed substantially uniformly in the low friction metal layer, the low friction performance and the water repellency are achieved uniformly in the low friction metal layer and irregularities having a size which influences the dynamic pressure are not produced, the particle size is preferably 0.01 through 10 μm and more preferably 0.1 through 0.5 μm.

As the metal base, Ni—P, Ni—B, Ni—Co—P, Ni, Ni—Co, Co, Ni—W or Cr can be used.

According to the hydrodynamic bearing of the second constitution, in one of the rotating member and the fixing member, a surface thereof opposed to other thereof is the low friction metal layer having water repellency constituted by dispersing very small particles realizing water repellency and low friction performance in a metal base and other can be constituted by a metal layer comprising a metal base similar to the low friction metal layer.

In this way, by dispersing the very small particles to the surface of the one opposed to the other of the rotating member and the fixing member and constituting the other by the metal layer of a similar metal base, wear of surfaces opposed to each other can be reduced further effectively.

Further, the invention can be constituted by the hydrodynamic bearing in which the very small particles are very small particles of a fluorine compound in the hydrodynamic bearing of the second constitution (third constitution).

As the small particle of the fluorine compound, there can be used a very small particle comprising at least one of PTFE (polytetrafluoroethylene), FEP (tetrafluoroethylene-hexafluoropropylene copolymer), PFA (tetrafluoroethylene-per-fluoroalkylbiphenylether copolymer), PCTFE (polychlorotrifluoroethylene), ETFE (tetrafluoroethylene-ethylene copolymer) and graphite fluoride and a mixture of a plurality of kinds of the very small particles. These particles are excellent in self lubricity, nonadherence, slidability (low friction performance), water repellency and oil repellency and are used preferably, particularly, the particle of PTFE is used further preferably.

Further, the present invention provides the hydrodynamic bearing in which the hardness of the low friction metal layer falls in a range equal to or larger than Hv600 and equal to or smaller than Hv1000 and the friction coefficient is equal to or smaller than 0.25 in the hydrodynamic bearing according to any one of the first constitution through the third constitution (fourth constitution).

In the hydrodynamic bearing according to any one of the first through the third constitutions, there can be formed the low friction metal layer having the hardness of Hv600 through 1000 and the friction coefficient equal to or smaller than 0.25. Further, the low friction metal layer having the hardness equal to or larger than Hv600 and the friction coefficient equal to or smaller than 0.25, maintains excellent wear resistance and durability against contact of the rotating member and the fixing member in accordance with starting and stopping to rotate the rotor and shows water repellency against dew condensation. Further, the low friction metal layer is preferably provided with the hardness equal to or smaller than Hv1000.

The invention achieves the above-described object by providing the hydrodynamic bearing apparatus having a stator, a rotor rotated relative to the stator and the hydrodynamic bearing having any one constitution of the first constitution through the fourth constitution (fifth constitution).

According to the hydrodynamic bearing apparatus of the fifth constitution, by adopting the hydrodynamic bearing having any one constitution of the first constitution through the fourth constitution, wear or electrification of the hydrodynamic bearing is restrained, corrosion by dew condensation is prevented and wear resistance and durability are promoted. Further, there can be prevented occurrence of adsorption between the rotating member and the fixing member by dew condensation and an increase in power consumption in starting by the adsorption can be restrained.

The invention achieves the above-described object by providing a method of fabricating a hydrodynamic bearing comprising a plating step of forming a low friction metal layer having water repellency constituted by dispersing very small particles realizing the water repellency and low friction performance in a composite plating metal base including at least one of phosphor and boron in at least one of base members of the rotating member and the fixing member on a face thereof opposed to other thereof by an electroless plating, a hardening treatment step of hardening the low friction metal layer by heating the one base member at predetermined hardening heat treatment temperature after the plating step, a stress relieving step for relieving stress of the base member by heating at temperature equal to or higher than the hardening heat treatment temperature of the hardening treatment prior to the plating treatment, and an integrating step of integrating the one and the other in a state in which the low friction metal layer of the one is opposed to the other and a hydrodynamic pressure can be generated between the one and the other (sixth constitution).

In the method of fabricating the hydrodynamic bearing according to the sixth constitution of the invention, the low friction metal layer is formed by the electroless plating and accordingly, the low friction metal layer having substantially uniform thickness can be formed, which is useful in a hydrodynamic bearing in which an error in the layer thickness needs to be controlled strictly.

Further, as the metal base, there is used a composite plating metal base including phosphor or boron and by heating after plating, the low friction metal layer having high hardness can be formed. Further, in the stress relieving step prior to the plating step, stress is relieved under temperature environment at hardening treatment temperature or higher and accordingly, deformation caused by the hardening treatment after the stress relieving step can be prevented.

The invention achieves the above-described object by providing a method of working a surface of a bearing for providing a low friction metal layer having water repellency on the surface of the bearing of a hydrodynamic bearing rotatably supporting a rotor, the method comprising an electroless plating step of forming the low friction metal layer including very small particles realizing the water repellency and low friction performance by an electroless plating on the surface of the bearing of the hydrodynamic bearing and a hardening heat treatment step of hardening the low friction metal layer by setting hardening heat treatment temperature to be equal to and higher than 200° C. and equal to and lower than 400° C. (seventh constitution).

In this way, in the hardening heat treatment step, by setting the hardening heat treatment temperature to be equal to or higher than 200° C. and equal to or lower than 400° C., there can be realized the hydrodynamic bearing having the low friction metal layer having the hardness and the friction coefficient of the fourth constitution.

DETAILED DESCRIPTION OF THE PREFERRED EMBODIMENT

An explanation will be given of embodiments of the invention in reference to the drawings. Here, an explanation will be given of constituent portions duplicated in the explanation of the related art by attaching common notations thereto.

Figure 1:
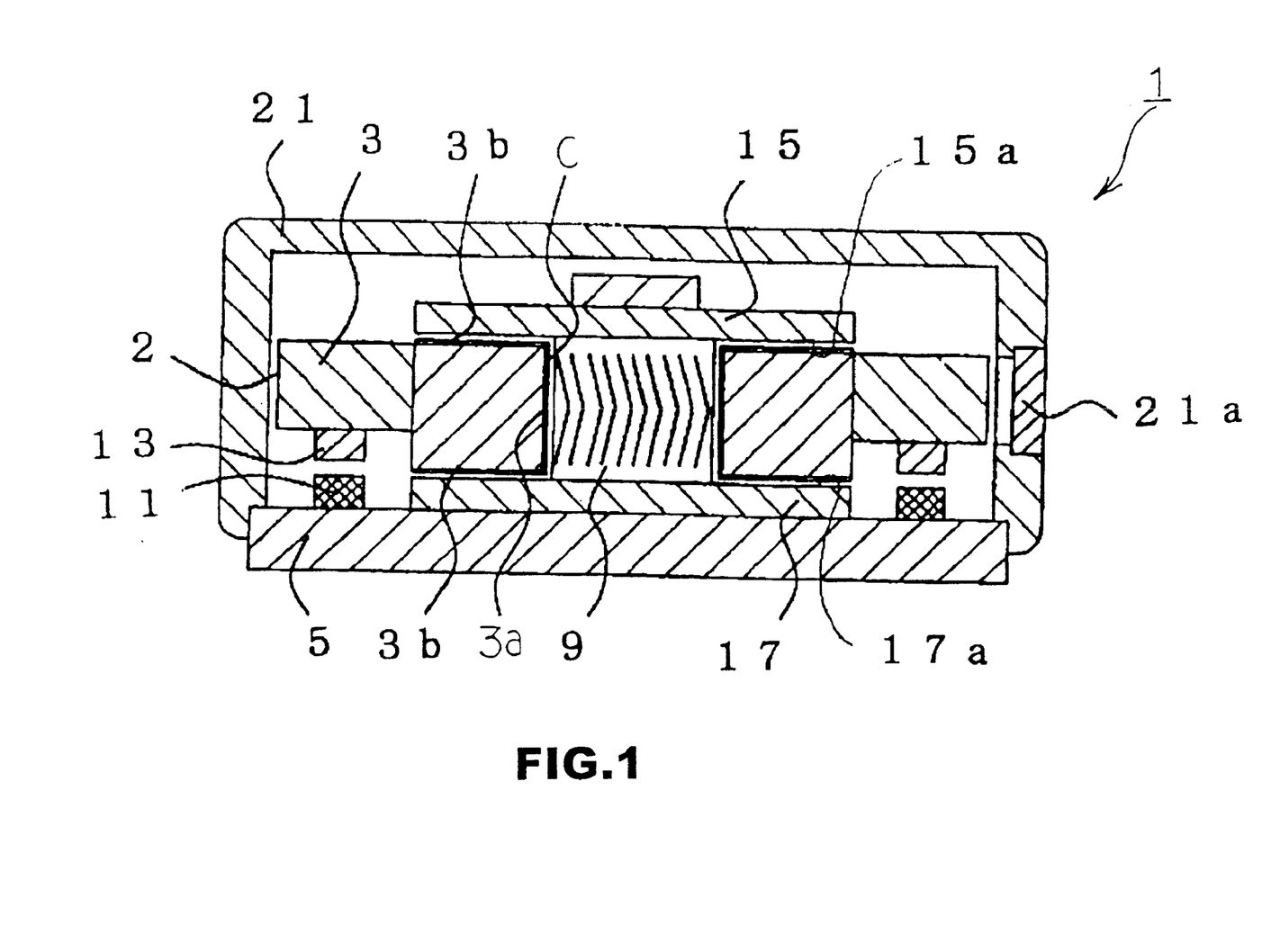
FIG. 1 is a view showing a vertical section of a polygon scanner motor apparatus constituting a rotating member apparatus according to an embodiment of the invention.

FIG. 1 shows a vertical sectional view of a polygon scanner motor apparatus according to an embodiment of the invention (a rotating member apparatus having a motor according to an embodiment of a hydrodynamic bearing apparatus according to the invention having an embodiment of a hydrodynamic bearing according to the invention and a polygon scanner motor constituting an embodiment of a hydrodynamic bearing apparatus according to the invention having an embodiment of a hydrodynamic bearing according to the invention).

The apparatus 1 is constituted by the rotating member 3 as a rotating member of a hydrodynamic bearing integrally having the multiple face mirror 2 and formed by an aluminum alloy and the fixing portion 5 for rotatably supporting the rotating member 3.

Figure 2:
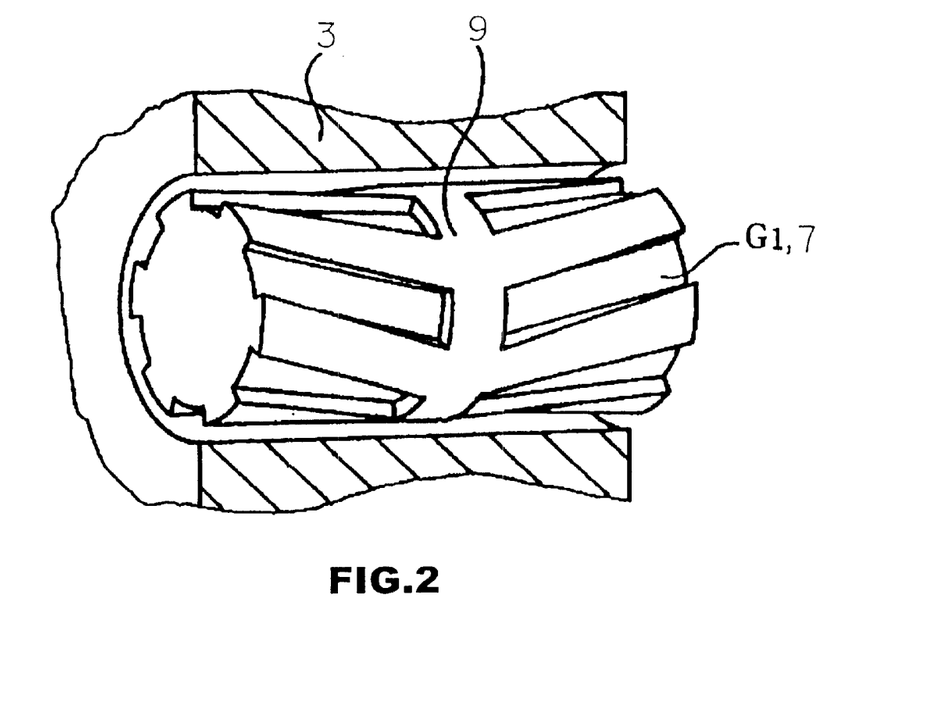
FIG. 2 is a view showing an example of a radial dynamic pressure generating groove.

The fixing portion 5 is provided with the fixing shaft 9 as a fixing member of a dynamic bearing, a side face of which is formed with a radial dynamic pressure generating groove 7 as dynamic pressure generating means such as a herring bone groove G1 shown in FIG. 2 and is inserted into a through hole 3a provided at a central portion of the rotating member 3 for supporting the rotating member 3 in a radial direction by pneumatic dynamic pressure.

Further, the fixing portion 5 is provided with the armature 11 having laminated steel plates and a coil wound around the steel plates, not illustrated, for generating rotational force in cooperation with the rotor magnet 13 provided at a position opposed to the armature 11 at a vicinity of an outer peripheral edge portion of the rotating member 3.

The rotating shaft 9 is provided with an upper thrust hold member 15 and a lower thrust hold member 17 made of aluminum and having a shape of a circular disk respectively at upper and lower portions thereof via the fixing shaft 9.

Figure 3:
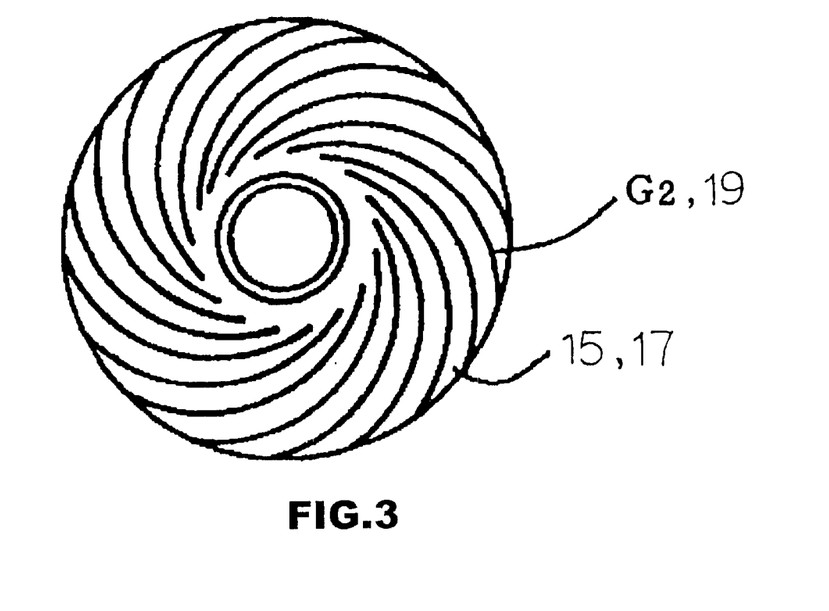
FIG. 3 is a view showing an example of a thrust dynamic pressure generating groove.

The respective members 15 and 17 are formed with thrust dynamic pressure generating grooves 19 as dynamic pressure generating means such as a spiral groove shown in FIG. 3 at faces 15a and 17a thereof opposed to the rotating member 3 inserted therebetween for supporting the rotating member 3 in a thrust direction by pneumatic dynamic pressure.

A low friction metal layer C having high hardness is provided on an inner peripheral face of the through hole 3a and faces 3b opposed to the upper and lower thrust hold members 15 and 17 of the rotating member 3.

The low friction metal layer C is constituted by dispersing very small particles realizing water repellency and low friction performance in a metal base of Ni—P.

According to the embodiment, content of phosphor (P) in the metal base is 9 w/w %. Further, according to the embodiment, the very small particle is a particle of PTFE (polytetrafluoroethylene) which is a fluorine compound and the particle size is 0.2 through 0.4 μm. As for the very small particle, in order that the particles are dispersed substantially uniformly in the low friction metal layer, a reduction in friction and water repellency are achieved uniformly in the low friction metal layer and irregularities having a size influencing the dynamic pressure are not produced, the particle size is preferably 0.01 through 10 μm and more preferably 0.1 through 0.5 μm. Further, the particles of PTFE are preferably included in the low friction metal by 15 through 60 v/v % and more preferably 25 through 40 v/v %.

Further, the hardness of the low friction metal layer C falls in a range of Hv600 through 1000 and the friction coefficient is equal to or lower than 0.25.

Further, although not illustrated, an outer peripheral face of the fixing shaft 9 and planes of the upper and lower thrust hold members 15 and 17 on the side of the rotating member, are provided with a metal layer by a metal of Ni—P similar to the metal base of the low friction metal layer C.

Further, laser beam incident from a laser incident and reflective optical window 21a provided at a cover 21, is reflected by the multiple face mirror 2 of the rotating member and is emitted again from the laser incident and reflect optical window 21a.

Next, an explanation will be given of a fabrication method of the dynamic bearing of the dynamic bearing apparatus having the above-described constitution.

FIGS. 7A, 7B, 7C, 7D and 7E are views showing an embodiment of a fabrication method of a dynamic bearing according to the invention and fabrication method of the dynamic bearing of the dynamic bearing apparatus.

According to the dynamic bearing apparatus, as shown by FIG. 7A, a base material 3k of the rotating member 3, a base material 9k of the fixing shaft 9 and base materials 15k and 17k of the upper and lower thrust hold members, are heated at 350° C. and stresses of these base materials are relieved (stress relief step) (FIG. 7A). The heating operation at the stress relief step is carried out at temperature equal to or higher than hardening heat treatment temperature of a hardening treatment, mentioned later.

Next, there is formed the low friction metal layer C having water repellency constituted by dispersing very small particles realizing water repellency and low friction performance in a composite plating metal base including phosphor by electroless plating on the face 3b of the base material 3k of the rotating member 3 opposed to the inner peripheral face of the through hole 3a and the upper and lower thrust hold members 15 and 17 at faces thereof opposed to the other (first plating step) (FIG. 7B).

Further, separately from the first plating step, there is formed a metal layer D by a metal of Ni—P similar to the metal base of the low friction metal layer C by electroless plating on the outer peripheral face of the fixing shaft 9 finished with the stress relief step and the planes of the upper and lower thrust hold members 15 and 17 on the side of the rotating member (second plating step) (FIG. 7C).

Further, the respective materials finished with the first plating step and the second plating step are heated at 200 through 350° C. to thereby harden the low friction metal layer C and the metal layer D (hardening treatment step) (FIG. 7D).

The low friction metal layer C and the metal layer D are hardened at hardening heat treatment temperature in a range equal to or higher than 200° C. and equal to or lower than 400° C. The hardening heat treatment temperature is set to temperature higher than normal in this way and therefore, in order to stably form the low friction metal layer C, it is preferable to set the thickness of the low friction metal layer C to be equal to or larger than 5 μm. According to the low friction metal layer C formed in this way, the hardness can be set to be equal to or higher than Hv600 and equal to or lower than Hv1000 and the friction coefficient can be set to be equal to or lower than 0.25.

Thereby, the rotating member 3, the fixing shaft 9 and the upper and lower thrust hold members 15 and 17 are finished.

After the hardening treatment, the rotating member 3, the fixing shaft 9 and the upper and lower thrust hold member 15 and 17 are integrated such that the friction metal layer C formed at the inner peripheral face of the through hole 3a of the rotating member 3 is opposed to the metal layer D of the outer peripheral face of the fixing shaft 9 by interposing a predetermined distance capable of generating hydrodynamic pressure therebetween and the low friction metal layer C formed at upper and lower planes of rotating member 3 are opposed to the metal layer D of the upper and lower thrust hold members 15 and 17 by interposing a predetermined distance capable of generating hydrodynamic pressure therebetween (integrating step) (FIG. 7E). Thereby, the above-described hydrodynamic bearing is finished. Further, in the fixing step, other members of the hydrodynamic bearing apparatus using the hydrodynamic bearing can be integrated in one operation.

Next, a detailed description will be given of the above-described first plating step for forming the low friction metal layer C having water repellency on the surface of the rotating member 3.

The first plating step includes steps of a degreasing treatment, an etching treatment, a smut removing treatment, a zincating treatment, a zincate exfoliating treatment, zincating treatment, an electroless nickel plating treatment, an electroless composite plating treatment and a drying treatment in this order. Further, among the respective steps, there are carried out rinsing steps for rinsing various solutions used in the treatments.

The degreasing treatment is a treatment for removing oil and fat or other stain on the surfaces of the base materials by alkali dip degreasing cleaning.

The etching treatment is a treatment for removing natural oxide films or segregated objects such as intermetallic compounds formed on the surfaces of the base materials by alkaline etching.

The smut removing treatment is a treatment for removing smut generated by alkaline etching by an acidic solution.

The zincating treatment is a treatment for forming coatings having high corrosion resistance on the surfaces of the base materials by substituting tin for aluminum on the surfaces of the base materials. Thereby, there can be provided plated films preventing corrosion of the base materials in plating solutions and having excellent adherence. Further, the effect of the zincating treatment is weak in one treatment and accordingly, there is carried out the zincate exfoliating treatment for exfoliating a tin coating which is substituted once by 50 v/v % nitric acid solution after zincating treatment and the zincating treatment is carried out again.

The electroless nickel plating treatment is a treatment which is carried out as matrix plating of an electroless composite metal coating. The electroless nickel plating treatment is carried out, since the adherence of the low friction metal layer C becomes higher when electroless nickel plating which does not include PTFE particles is carried out once than in the case that electroless composite plating is carried out directly on the base materials after the zincating treatment.

The electroless composite plating treatment is a treatment of forming the low friction metal layer C having a metallic property and also having a property of nonmetallic PTFE by combining the metal of Ni—P and the nonmetal of PTFE. The low friction metal layer C shows self lubricity by PTFE and shows predetermined hardness by Ni—P. Thereby, wear of metal can be made as small as possible in physical motion.

Figure 8:
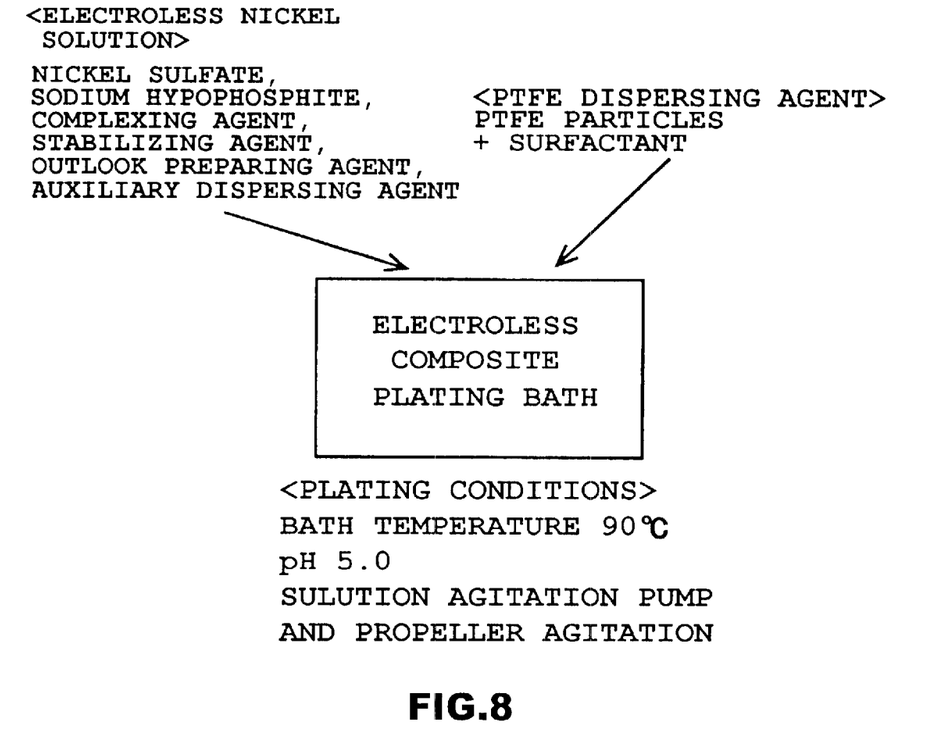
FIG. 8 is a explanatory view for explaining an electroless composite plating treatment which is carried out in the fabrication method of the dynamic bearing shown in FIGS. 7A, 7B, 7C, 7D and 7E.

FIG. 8 is an explanatory view for explaining the electroless composite plating treatment.

As shown by FIG. 8, according to the electroless composite plating treatment in the first plating step, the metal layer is formed by dispersing downsized PTFE particles in a nickel plating bath (electroless composite plating bath) added with a cationic surfactant to thereby form the metal layer.

The electroless composite plating bath is a sodium hypophosphite reducing bath. According to the embodiment, in an electroless nickel solution produced by pertinently mixing a complexing agent, a stabilizing agent, an outlook preparing agent and an auxiliary dispersing agent to nickel sulfate, and sodium hypophosphite (a hydrophosphite), PTFE particles having a particle size of 0.2 through 0.4 μm and a surfactant are mixed and PTFE particles are dispersed by the surfactant to thereby prepare a plating solution having PH5.0 (first plating solution shown in FIG. 7).

PTFE has extremely high hydrophobicity and accordingly, in order to disperse PTFE particles in the plating solution, the surfactant is bonded onto the surface of the particles of PTFE by hydrophobic bond to thereby make the surface of the particle coated by the surfactant hydrophilic, coagulation of the particles are restrained by repulsion of surface charge and the particles are dispersed in the plating solution. As the surfactant, there can be used a cationic surfactant and amphoteric surfactant and the cationic surfactant is preferable as it helps adsorb PTFE particles on the plated surfaces by migrating PTFE particles to the surfaces of the base materials which are catalytically activated by hypophosphorous acid.

Further, while agitating by a pump and a propeller at bath temperature of 90° C., the base materials are dipped and electroless composite plating treatment is carried out. By the electroless composite plating treatment, the surfaces of the base materials are plated in a state in which PTFE particles the surfaces of which are covered by the surfactant are dispersed in the Ni—P metal base. The surfactant is decomposed and evaporated by heating at a hardening treatment step after the first plating step.

Further, as a plating solution of the second plating treatment (second plating solution shown in FIG. 7), there can be used the electroless nickel solution used in preparing the above-described first plating solution.

According to the polygon scanner motor apparatus having the above-described constitution fabricated by the above-described fabrication method, by providing the low friction metal layer C, wear of the apparatus caused by contact of the dynamic bearing portion in starting and stopping is prevented to thereby promote durability, and working of the dynamic pressure generating groove of the hydrodynamic bearing can be facilitated to thereby promote a reduction in fabrication cost. Further, since the friction metal layer C is provided with electric conductivity, different from the case having no electric conductivity as in the low friction resin layer, static electricity can be prevented from being stored at the rotating member 3.

Further, since the low friction metal layer C is provided with water repellency, for example, the bearing faces can be prevented from adsorbing each other by, for example, dew condensation and the base materials can be prevented from being corroded.

Further, although according to the embodiment, the low friction metal layer C having water repellency is formed at the base material of the rotating member 3 made of an aluminum alloy which is light metal, the low friction metal layer C having water repellency can be formed also by nonferrous metal such as brass or SUS (stainless steel) than light metal of an aluminum alloy. Therefore, further light weight formation can be achieved in the rotating member or the fixing member formed with the low friction metal layer C by using magnesium or an alloy thereof having a smaller specific weight.

Further, the low friction metal layer C can be provided not only on the face opposed to the dynamic pressure generating groove but also the face formed with the dynamic pressure generating groove with similar effect.

In addition thereto, although an explanation has been given of the rotating member apparatus constituting a drive source by the hydrodynamic bearing apparatus according to the invention as an embodiment of the polygon scanner apparatus, the rotating member is not naturally limited thereto.

Figure 4:
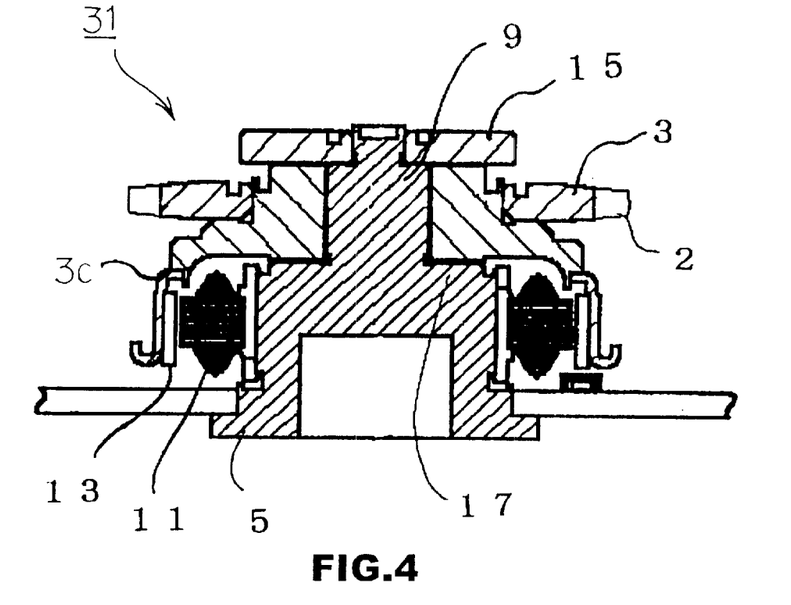
FIG. 4 is a view showing a vertical section of a polygon scanner motor apparatus constituting a rotating member apparatus according to other embodiment of the invention.

For example, according to a polygon scanner motor apparatus 31 illustrated in FIG. 4, the armature 11 is provided on the lower side of the fixing shaft 9, the rotor magnet 13 is provided at an inner peripheral face of a rotor hub 3c provided to the rotating member 3 at a position opposed to the armature 11 and the lower thrust hold member 17 and the fixing portion 5 are integrally formed, however, by providing the low friction metal layer C at faces of the rotating member 3 opposed to dynamic pressure generating grooves, a similar effect is naturally achieved.

Figure 5:
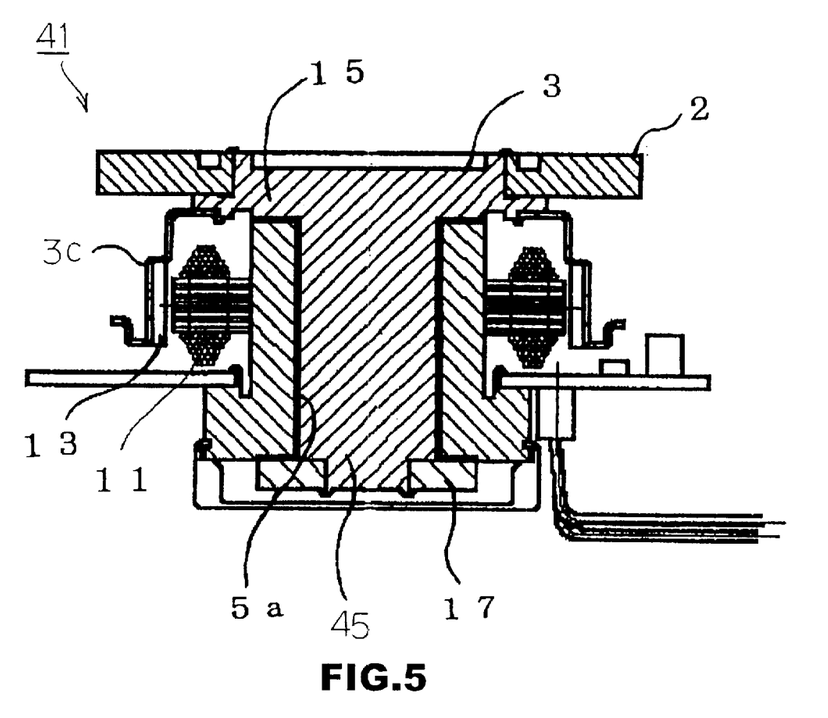
FIG. 5 is a view showing the vertical section of a polygon scanner motor apparatus constituting a rotating member apparatus according to other embodiment of the invention.

Further, even in a case of a polygon scanner motor apparatus 41 illustrated in FIG. 5 in which the rotating member 3 is provided with a shaft 45 formed with a dynamic pressure generating groove at its side face and the fixing portion 5 is provided with a through hole 5a inserted with the shaft 45, by providing the low friction metal layer C at a face of the rotating member 3 formed with the dynamic pressure generating groove, a similar effect is naturally achieved.

Further, the low friction metal layer C is applicable also to other rotating member apparatus, for example, a pivoting motor, a fan motor or a spindle motor for an optical/magnetic disk.

Figure 9A:
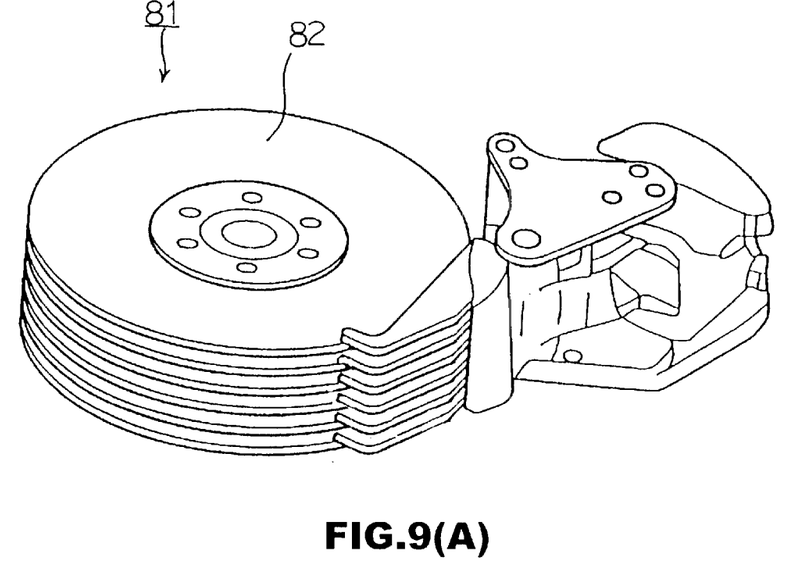
FIGS. 9A and 9B are views showing a disk apparatus constituting a rotating member apparatus according to other embodiment of the invention.
Figure 9B:
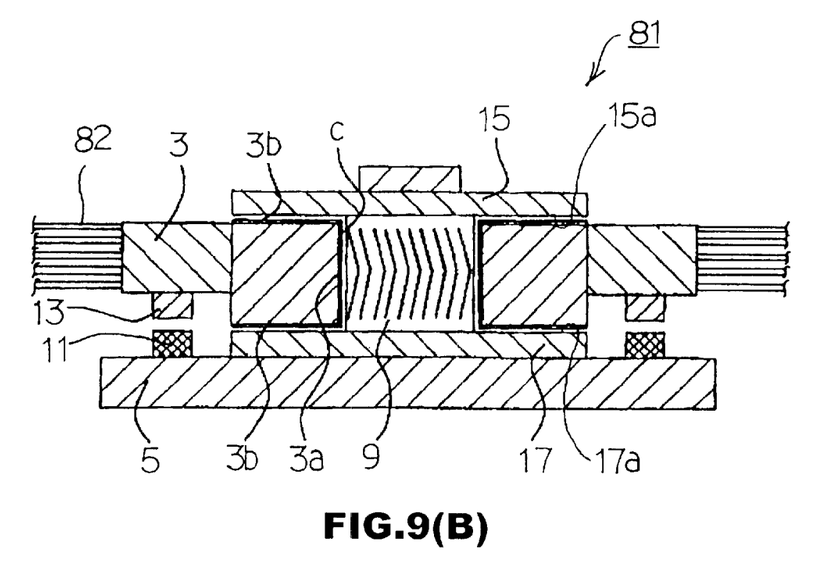

FIGS. 9A and 9B show other embodiment of a hydrodynamic bearing apparatus according to the invention using the hydrodynamic bearing according to the above-described embodiment and are views showing a disk apparatus as other example of a rotating member apparatus driven by the hydrodynamic bearing apparatus (motor) of the above-described embodiment in which FIG. 9A is a perspective view and FIG. 9B is a sectional view in an axis line direction.

As shown by FIGS. 9A and 9B, according to the rotating member apparatus (disk apparatus), the rotating member 3 is not provided with the rotating mirror 2, a plurality of sheets of disks 82 such as magnetic disks or optical disks are carried by the outer periphery of the rotating member and the disks 82 are rotated along with the rotating member 3. Further, the rotating member 3 is made of SUS (stainless steel).

The low friction metal layer C having water repellency can be formed not only on light metal of an aluminum alloy but also SUS and accordingly, the low friction metal layer C is formed also at the rotating member (rotating member 3) or the fixing member of the hydrodynamic bearing made of SUS similar to those in a disk apparatus of a related art and an effect similar to that in the above-described embodiment can be achieved.

Further, the low friction metal layer C can be constituted by a hard alumite-treated layer or a hard chromium plated layer.

As has been explained, according to the hydrodynamic bearing, the hydrodynamic bearing apparatus, the fabrication method of the hydrodynamic bearing apparatus and the bearing surface working method of the invention, metal such as light metal or nonferrous metal can be used for the rotating member or the fixing member of the hydrodynamic bearing and the fabrication cost can be reduced.

Further, the invention is featured in providing the low friction metal layer having water repellency at the bearing surface of the hydrodynamic bearing in the hydrodynamic bearing apparatus for supporting rotatably the rotor by the hydrodynamic bearing and accordingly, wear of the apparatus caused by contact of the dynamic bearing portion in starting and stopping thereof is prevented to thereby promote durability and working of the dynamic pressure generating groove of the hydrodynamic bearing can be facilitated to thereby achieve a reduction in the fabrication cost of the apparatus. The low friction metal layer is provided with electric conductivity and accordingly, static electricity can be prevented from being stored in the rotating member.

Further, since the low friction metal layer is provided with water repellency, the bearing faces can be prevented from being adsorbed to each other by, for example, dew condensation.

Further, the hardness can be made to be equal to or higher than Hv600 and equal to or lower than Hv1000 and the friction coefficient can be made to be equal to or smaller than 0.25. Thereby, the durability can be promoted to a degree capable of preventing wear of the apparatus caused by contact of the dynamic bearing portion in starting and stopping thereof and there can be realized the low friction metal layer capable of reducing loss of the dynamic pressure effect.

What is claimed is:

1. A hydrodynamic bearing comprising:
a fixing member fixed to a side of a stator;
a rotating member fixed to a side of a rotor capable of rotating relative to the stator and opposed to the fixing member via a fluid; and
hydrodynamic pressure generating means for generating a dynamic pressure by the fluid between the rotating member and the fixing member in rotating the rotor;
wherein in at least one of the rotating member and the fixing member, a surface thereof opposed to other thereof is a low friction metal layer having water repellency.

2. The hydrodynamic bearing according to claim 1:
wherein the low friction metal layer having the water repellency is constituted by dispersing very small particles realizing the water repellency and low friction performance in a metal base.

3. The hydrodynamic bearing according to claim 2:
wherein the very small particles are very small particles of a fluorine compound.

4. The hydrodynamic bearing according to claim 1:
wherein a hardness of the low friction metal layer falls in a range of Hv of 600 through 1000 and a friction coefficient thereof is equal to or smaller than 0.25.

5. A hydrodynamic bearing apparatus comprising:
a stator;
a rotor rotated relative to the stator; and the hydrodynamic bearing according to an one of claims 1 through 4.

* * * * *